United States Patent
Thomas et al.

(10) Patent No.: US 8,273,153 B2
(45) Date of Patent: Sep. 25, 2012

(54) DRY NATURAL GAS LIQUEFACTION METHOD

(75) Inventors: Michel Thomas, Lyons (FR); Beatrice Fischer, Lyons (FR); Gilles Ferschneider, Chaponnay (FR)

(73) Assignee: IFP Energies nouvelles, Rueil-Malmaison Cedex (FR)

( * ) Notice: Subject to any disclaimer, the term of this patent is extended or adjusted under 35 U.S.C. 154(b) by 260 days.

(21) Appl. No.: 12/679,796

(22) PCT Filed: Sep. 23, 2008

(86) PCT No.: PCT/FR2008/001321
§ 371 (c)(1),
(2), (4) Date: Jul. 6, 2010

(87) PCT Pub. No.: WO2009/074737
PCT Pub. Date: Jun. 18, 2009

(65) Prior Publication Data
US 2010/0263532 A1 Oct. 21, 2010

(30) Foreign Application Priority Data
Sep. 24, 2007 (FR) ...................................... 07 06682

(51) Int. Cl.
*B01D 53/02* (2006.01)
(52) U.S. Cl. ................. 95/117; 95/106; 95/121; 95/143; 62/606; 62/611; 62/612; 62/613; 62/618; 62/619
(58) Field of Classification Search ............... 95/106, 95/117, 121, 143; 62/606, 611–613, 618, 62/619
See application file for complete search history.

(56) References Cited

U.S. PATENT DOCUMENTS

| | | | | |
|---|---|---|---|---|
| 2,374,091 A * | 4/1945 | Garrison | ........................ | 62/636 |
| 2,519,343 A * | 8/1950 | Berg | .................. | 95/93 |
| 3,660,967 A * | 5/1972 | Collins et al. | ................... | 95/137 |
| 3,735,600 A * | 5/1973 | Dowdell et al. | ................. | 62/619 |
| 3,841,058 A | 10/1974 | Templeman | | |
| 4,425,142 A | 1/1984 | Mann | | |
| 4,544,384 A | 10/1985 | Metschl et al. | | |
| 4,822,393 A * | 4/1989 | Markbreiter et al. | ........... | 62/632 |
| 5,106,399 A * | 4/1992 | Fisher | ............................. | 62/636 |
| 5,223,145 A | 6/1993 | Markovs | | |
| 5,486,227 A | 1/1996 | Kumar et al. | | |

(Continued)

FOREIGN PATENT DOCUMENTS

DE 3243656 A1 5/1984

(Continued)

*Primary Examiner* — Duane Smith
*Assistant Examiner* — Christopher P Jones
(74) *Attorney, Agent, or Firm* — Millen, White, Zelano & Branigan, P.C.

(57) ABSTRACT

The method allows liquefaction of a dry natural gas comprising water and heavy hydrocarbons containing more than five carbon atoms. The following stages are carried out:
a) passing the dry natural gas through a water-adsorbent solid so as to obtain a water-depleted natural gas and a water-laden adsorbent solid,
b) passing the water-depleted natural gas through a solid adsorbing heavy hydrocarbons comprising at least five carbon atoms so as to obtain a heavy hydrocarbon-depleted natural gas and a heavy hydrocarbon-laden adsorbent solid,
c) liquefying the heavy hydrocarbon-depleted natural gas at a pressure above 40 bar abs so as to obtain a liquid natural gas under pressure,
d) expanding the liquid natural gas under pressure obtained in stage c) to atmospheric pressure so as to obtain a liquid natural gas and a gas fraction.

9 Claims, 1 Drawing Sheet

U.S. PATENT DOCUMENTS

| | | | | |
|---|---|---|---|---|
| 6,041,619 A | * | 3/2000 | Fischer et al. | 62/612 |
| 6,378,330 B1 | * | 4/2002 | Minta et al. | 62/613 |
| 2003/0005722 A1 | * | 1/2003 | Wilkinson et al. | 62/613 |
| 2005/0113468 A1 | * | 5/2005 | Fischer et al. | 518/726 |
| 2006/0191410 A1 | | 8/2006 | Dolan et al. | |

FOREIGN PATENT DOCUMENTS

| | | |
|---|---|---|
| EP | 0723001 A | 7/1996 |
| FR | 2174879 A | 10/1973 |
| WO | 2007018677 A | 2/2007 |
| WO | PCT/FR08/01321 R | 6/2009 |

* cited by examiner

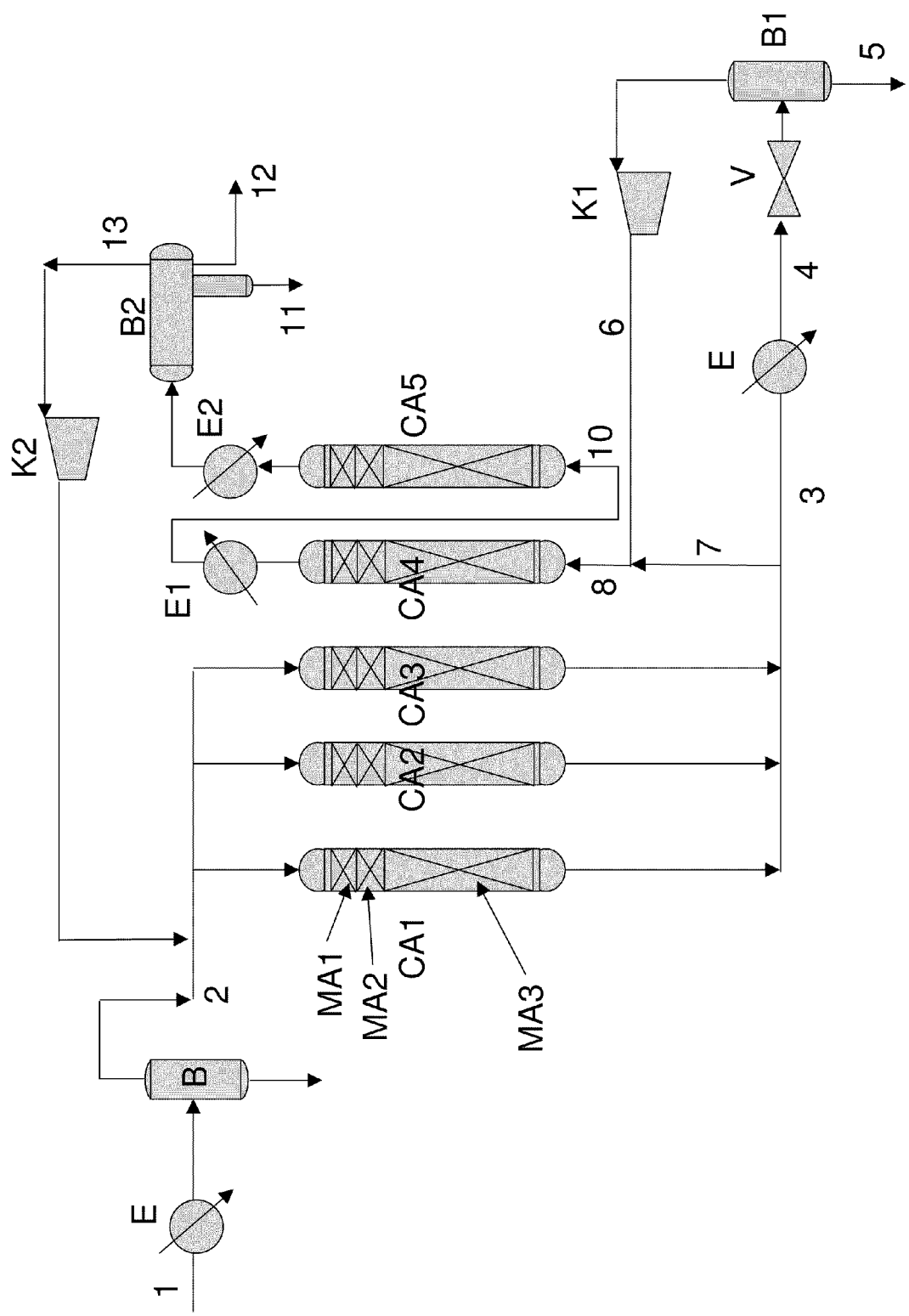

DRY NATURAL GAS LIQUEFACTION METHOD

FIELD OF THE INVENTION

The present invention relates to the sphere of dry natural gas liquefaction.

BACKGROUND OF THE INVENTION

Natural gas is often produced in sites remote from the places where it is intended to be used. A method used for transporting it consists in liquefying the natural gas around −160° C. and in transporting it by ship in liquid form at atmospheric pressure.

Prior to being liquefied, the natural gas is subjected to various treatments in order, on the one hand, to adjust its composition with a view to its sale (sulfur and carbon dioxide content, calorific value, etc.) and, on the other hand, to allow its liquefaction. The water has to be removed from the natural gas to prevent natural gas hydrates formation at low temperature, such hydrates being likely to clog the lines and the heat exchangers of the liquefaction plant. Benzene also crystallizes at low temperature and its proportion has to be adjusted below 1 ppm. The presence of heavy paraffins can also cause operating problems when they are in detectable proportions.

The usual treatments are a deacidizing stage in order to remove the hydrogen sulfide ($H_2S$) and the carbon dioxide ($CO_2$), followed by a dehydration stage. It is also common practice to collect the mercury contained in the natural gas, which would damage the devices made of aluminium alloy used to operate at cryogenic temperatures. During cooling of the natural gas, a fractionation stage during which the composition of the natural gas is adjusted by distillation in order to remove all the too heavy hydrocarbon compounds is commonly carried out. The proportion of ethane, propane and butane extracted by distillation is very large in relation to the heavier hydrocarbons, which are readily carried along to the bottom of the distillation column.

Problems arise when the natural gas is dry. A dry natural gas contains a very small proportion of hydrocarbons heavier than methane. Although the proportion of heavy hydrocarbons containing more than five carbon atoms is small, it is however necessary to remove these heavy hydrocarbons to prevent crystallization and clogging problems. Now, dry gases do not contain enough ethane, propane and butane to carry heavy hydrocarbons along towards the bottom of the distillation column. The distillation operation is therefore not efficient for removing the heavy hydrocarbons contained in a dry natural gas.

The present invention provides a liquefaction method comprising a stage of removing the water and the heavy compounds to allow liquefaction of a dry natural gas under good conditions.

The method according to the invention consists in adsorbing the water and the unwanted heavy hydrocarbons on at least two layers of different adsorbent materials prior to carrying out the high-pressure liquefaction stages.

SUMMARY OF THE INVENTION

In general terms, the present invention describes a method of liquefying a dry natural gas comprising water, methane and less than 1% by mole of hydrocarbons heavier than methane, wherein the following stages are carried out:

a) passing the dry natural gas through a water-adsorbent solid so as to obtain a water-depleted natural gas and a water-laden adsorbent solid, b) passing the water-depleted natural gas through a solid adsorbing heavy hydrocarbons comprising at least five carbon atoms so as to obtain a heavy hydrocarbon-depleted natural gas and a heavy hydrocarbon-laden adsorbent solid, c) liquefying the heavy hydrocarbon-depleted natural gas at a pressure above 40 bar abs (1 bar=0.1 MPa) so as to obtain a liquid natural gas under pressure, and d) expanding the liquid natural gas under pressure obtained in stage c) to atmospheric pressure so as to obtain a liquid natural gas and a gas fraction.

According to the invention, the water-adsorbent solid can be selected from among 3A, 4A and 5A sieves. The heavy hydrocarbon-adsorbent solid can be selected from among X and Y faujasite zeolites, and activated charcoals.

The adsorbent solids can be regenerated by passing a purge gas at high temperature, ranging between 150° C. and 400° C., through the heavy hydrocarbon-laden adsorbent solid, then through the water-laden adsorbent solid. The purge gas can consist of a portion of the heavy hydrocarbon-depleted natural gas. Alternatively, the purge gas can consist of said gas fraction obtained in stage d).

Stage c) can consist in cooling the natural gas by heat exchange.

Prior to stage a), the natural gas can be passed through a mesoporous adsorbent material. The mesoporous adsorbent material can be selected from among activated aluminas and silica gels.

Prior to stage a), a dry natural gas deacidizing stage can be carried out.

Prior to stage a), the dry natural gas can be cooled to a temperature ranging between 20° C. and 40° C., the water condensed upon cooling being separated from the dry natural gas.

Using two adsorbent solids allows to remove the water and the heavy compounds in a single processing unit, economically, in order to carry out liquefaction of the gas under good conditions.

BRIEF DESCRIPTION OF THE SOLE FIGURE

Other features and advantages of the invention will be clear from reading the description hereafter, with reference to FIG. 1 that diagrammatically illustrates the method according to the invention.

DETAILED DESCRIPTION

In FIG. 1, the dry natural gas flowing in through line 1 consists of methane and ethane, and it contains a small proportion of hydrocarbons heavier than methane, for example less than 1% by mole, preferably less than 0.5% by mole, or even less than 0.3% by mole, of hydrocarbons heavier than methane. The gas may have first been subjected to a deacidizing stage, for example by washing with an amine-containing absorbent solution, for example by means of one of the methods described in documents FR-2,820,430, FR-2,062,138 or U.S. Pat. No. 4,412,977.

The gas circulating in line 1 can undergo cooling in heat exchanger E, for example to a temperature ranging between 20° C. and 40° C. The water condensed upon cooling is separated from the gas in separating drum B. The condensed water is discharged at the bottom of drum B. The water-freed gas is discharged at the top of drum B through line 2.

The natural gas circulating in line 2 is fed into parallel-operated capacities CA1, CA2 and CA3. The number of capacities to be used is adjusted according to the flow rate of the gas to be treated. The capacities contain at least two different adsorbent materials MA2 and MA3. As the gas coming from line 2 flows through capacities CA1, CA2 and CA3, the adsorbent materials are at the pressure of the gas, typically at a pressure above 40 bars abs.

The natural gas first flows through adsorbent material MA2 in order to be dehydrated. Adsorbent material MA2 used for dehydration of the natural gas can be selected from among the molecular sieves of the family commonly referred to as LTA, which comprises the 4A molecular sieves (exchanged with $Na^+$ ions), the 3A molecular sieves (exchanged with $K^+$ and $Na^+$ ions) and the 5A molecular sieves (exchanged with $Ca^{2+}$ and $Na^+$ ions). Type A molecular sieves are characterized by a Si/Al molar ratio close to 1. The compensating cations are sodium for 4A sieves, sodium and potassium for 3A sieves with a $K^+/Na^+$ exchange rate above 15%, and sodium and potassium with a $Ca^{2+}/Na^+$ exchange rate above 50%. The pore-opening sizes for these three types of molecular sieves are about 3 Å (3A sieve), 4 Å (4A sieve) and 4.5 Å (5A sieve). 3A and 4A molecular sieves only adsorb the water molecules since the size of the molecules of hydrocarbons comprising more than five carbon atoms, notably aromatic hydrocarbons such as benzene, is larger than the size of the pore openings of these sieves. After flowing through the layer of material MA2, the dry natural gas is dehydrated but it still comprises heavy hydrocarbons. Material MA2 is laden with water.

When the water content of the natural gas flowing in through line 2 is close to saturation, for example for a relative humidity above 50%, preferably above 70%, a complementary first layer of adsorbent material MA1 can be provided to remove a large amount of water. This layer of material MA1 is optional. MA1 can be a mesoporous adsorbent of activated alumina type whose specific surface area ranges between 100 and 350 m²/g, or of silica gel type whose specific surface area can range between 150 and 900 m²/g. Adsorbent material MA1 can come in form of balls or extrudates whose dimensions can range between 1 and 5 mm The layer of adsorbent material MA1 is arranged upstream from the layer of adsorbent material MA2. The natural gas circulating in capacities CA1, CA2 or CA3 flows through first mesoporous adsorbent material MA1 to remove a large amount of water contained in the gas. Then the partly dehydrated gas flows through second adsorbent material MA2 that achieves deep dehydration of the gas. After passage of the gas, material MA1 is laden with water.

The gas from MA2 is sent through adsorbent material MA3. Removal of the heavy hydrocarbons, i.e. comprising more than five carbon atoms, contained in the dehydrated natural gas is achieved by an adsorbent material whose pore size is larger than that of the LTA type sieves. Material MA3 is selected from among the faujasite type molecular sieves commonly referred to as X and Y zeolites. The zeolites used have a pore size of approximately 7.5 Å. The Si/Al molar ratio ranges between 1.2 and 1.5 for the X sieves and it is above 2.4 for the Y sieves. The exchange cation is sodium. Material MA3 is also selected from among activated charcoals having preferably a specific surface area ranging between 700 and 200 m²/g. After flowing through the layer of material MA3, the natural gas is freed of the heavy hydrocarbons and it can be sent to the liquefaction stage. After passage of the gas, material MA3 is laden with heavy hydrocarbons.

X and Y type molecular sieves are used in form of balls or extrudates, by means of a binder, clay for example, whose dimensions can range between 0.5 and 3.5 mm The binder can possibly be zeolitised, i.e. converted to a zeolite of same nature by means of a suitable thermal treatment, so as to increase the adsorption capacity towards water or hydrocarbons.

The capacities are at a pressure ranging between 10 bars and 100 bars, and at a temperature ranging between −50° C. and 100° C. The surface circulation rate of the gas in capacities CA1, CA2 and CA3 can range between 0.5 and 30 m/min, preferably between 1 and 10 m/min.

According to the invention, a natural gas whose water and heavy hydrocarbon proportions are compatible with liquefaction by heat exchange is obtained at the outlet of capacities CA1, CA2 and CA3. In general, the gas from the capacities has a water content below 0.1 ppm, a heavy hydrocarbon (C5+) content below 1 ppm and a benzene content below 1 ppm. Removal of the heavy hydrocarbons by means of sieves allows to avoid lowering the pressure of the natural gas and to carry out liquefaction at high pressure. In adsorption mode, capacities CA1, CA2 and CA3 are at the pressure of the gas, i.e. a pressure above 40 bars. The energy required for liquefaction of the natural gas is thus decreased. According to the invention, liquefaction of the natural gas is performed without intermediate stages. The gas collected at the outlet of capacities CA1, CA2 and CA3 is fed through line 3 into heat exchange device E in order to be liquefied by cooling. Device E can consist of one or more heat exchangers operated in series and/or in parallel. According to the invention, only cooling is carried out in device E. No separation operation is performed during cooling. In general, liquefaction can be carried out in E at high pressure, above 40 bar abs., preferably above 50 bar abs. or even 70 bar abs., and up to a temperature ranging between −145° C. and −160° C.

The liquid natural gas under pressure obtained at the outlet of exchanger E is fed into expansion device V, a valve, a turbine or a combination of a valve and of a turbine, to be expanded to atmospheric pressure. Expansion in V allows the natural gas to be subcooled to a temperature below −160° C. At the outlet of expansion device V, the natural gas stream is separated in drum B1. The liquid discharged through line 5 at the bottom of drum B1 is the liquid natural gas. The vapour fraction discharged at the top of drum B1, commonly referred to as boil-off gas, can be compressed by compressor K1 prior to being used again.

Capacities CA1, CA2, CA3, CA4 and CA5 operate in parallel, successively and cyclically in adsorption, regeneration and cooling mode. In connection with FIG. 1, capacities CA1, CA2 and CA3 work in adsorption mode. Capacities CA4 and CA5, identical to capacities CA1, CA2 and CA3, work respectively in cooling mode and in regeneration mode.

The adsorbent materials are regenerated by hot gas sweeping in order to desorb the hydrocarbons and the water contained in the pores of the adsorbent materials.

A purge gas flowing in through line 8 is fed into capacity CA4. Capacity CA4 is at high temperature because it has previously been subjected to the regeneration mode. The purge gas introduced into CA4 can be a portion of the gas from capacities CA1, CA2 or CA3, and/or a portion of the boil-off gas produced upon expansion of the liquid natural gas under pressure. A standard volume flow rate of purge gas ranging between 2 and 30% of the standard volume flow rate of the gas to be purified, preferably between 5 and 15%, is used. As it flows through capacity CA4, the gas warms up and capacity CA4 is cooled. The gas from CA4 is heated in heat exchanger E1, then fed through line 10 into capacity CA5. In E1, the gas can be heated for example to a temperature ranging between 150° C. and 400° C., or even between 200° C. and 400° C., preferably a temperature ranging between 180°

C. and 350° C., or even between 300° C. and 350° C., for example by a heat carrier heated in the exhaust of a gas turbine.

According to the invention, the hot purge gas fed into CA5 first flows through hydrocarbon-laden material MA3, then through material MA2, and possibly through water-laden material MA1. This direction of circulation of the gas prevents the water contained in layer MA2 and possibly MA1 from coming into contact with water-sensitive material MA3 that would be damaged by the water.

The heavy hydrocarbons and the water trapped in materials MA3, MA2 and possibly MA1 are partly released under the effect of the heat provided by the purge gas. These elements are discharged from capacity CA5 with the hot gas and they are cooled in heat exchanger E2. The gas laden with water and heavy hydrocarbons is cooled in E2 for example by cooling water or air, to a temperature allowing to condense a large part of the water and of the heavy hydrocarbons. For example, the gas is cooled to a temperature ranging between 30° C. and 50° C. The cooled gas laden with condensates is fed into separating drum B2. Drum B2 allows to separate the liquid fraction from the gas fraction that is discharged through line 13. The liquid fraction decants at the bottom of B2 so as to achieve separation between the water discharged through line 11 and the heavy hydrocarbons discharged through line 12. The condensate-freed gas that still contains traces of water and of heavy hydrocarbons is recycled and sent through compressor K2 to the inlet of capacities CA1, CA2 and CA3.

Periodically, before the adsorbent materials are saturated, the capacities change roles. For example, capacity CA1 switches to the regeneration mode instead of CA5, whereas CA5, whose materials have been regenerated, switches to the cooling mode instead of CA4 and CA4, which has been cooled, switches to the adsorption mode instead of capacity CA1.

The numerical example given hereafter allows to illustrate the operating mode of the liquefaction method described in connection with FIG. 1.

45,000 kmol/h, i.e. $1.009 \cdot 10^6$ Nm$^3$/h, of a dry natural gas at 70 bar and 18° C., having the composition as follows, are treated:

| Component | Concentration (mol %) |
|---|---|
| N2 | 3.7 |
| C1 | 96 |
| C2 | 0.1 |
| C3 | 0.02 |
| iC4 | 0.01 |
| nC4 | 0.01 |
| C5+ | 1000 ppm |
| Benzene | 100 ppm |
| H2O | 400 ppm |
| CO2 | 50 ppm |

Prior to liquefaction, the water, the benzene and the C5+ hydrocarbons have to be removed from the natural gas in order to prevent clogging in the heat exchangers. On the other hand, it is not necessary to remove the C2, C3 and C4 hydrocarbons that are present in low concentrations in the gas.

The following elements are used for the gas to meet the specifications required for liquefaction:
 a 4A type sieve to remove the water (material MA2),
 a 13X type sieve to retain the heavy hydrocarbons and the benzene (material MA3).

Capacities CA1, CA2 and CA3 work in adsorption mode and in parallel, with a shift of one third of a period between them, the duration of an adsorption period being 9 hours.

Under such conditions, each capacity has an inside diameter of 4.3 m and a total adsorbent bed height of 11 m, the surface flow rate of the gas being 4.9 m/min in the capacities.

Each capacity contains a layer of 4A type material MA2 of 9700 kg that is used to remove the water from the natural gas. The amount of water adsorbed is 108 kg/h/capacity, the dynamic adsorption capacity, i.e. the capacity variation between the saturated adsorbent material and the regenerated adsorbent material, being taken equal to 10% of the mass of the sieve.

Furthermore, each capacity contains a layer of 13X type material MA3 of 97,300 kg that is used to remove the C5+ hydrocarbons, notably the benzene. The amount of hydrocarbons adsorbed is 1617 kg/h/capacity, the dynamic adsorption capacity being taken equal to 15% of the mass of the sieve.

Capacity CA4 works in cooling mode for 3 hours. Capacity CA5 works in regeneration mode for 3 hours. The regeneration conditions are a maximum temperature of 300° C. and a purge gas flow rate of 10% of the flow rate of the gas to be treated, i.e. $1.009 \cdot 10^5$ Nm$^3$/h.

The diameter of the capacities is determined by the flow rate of the natural gas to be treated and it would therefore be identical if the gas only had to be dehydrated. The regeneration of layers MA3 and MA2 is only slightly different from the regeneration of a molecular sieve that has only been used for dehydration: the purge gas has to be heated to the same temperature. Only the duration of the regeneration stage is a little longer. Furthermore, adsorption of the heavy hydrocarbons requires no additional equipment since heavy hydrocarbon-adsorbent material MA3 is contained in the same capacity as water-adsorbent material MA2. Thus, the treatment overcost, according to the invention, for removing the hydrocarbons is therefore marginal in relation to a simple dehydration treatment. Besides, the absence of distillation of the gas during cooling in device E allows liquefaction to be carried out at high pressure and thus the energy required for liquefaction to be decreased.

The invention claimed is:

1. A method of liquefying a dry natural gas comprising water, methane and less than 1% by mole of hydrocarbons heavier than methane, wherein the following stages are carried out: a) passing the dry natural gas through a water-adsorbent solid so as to obtain a water-depleted natural gas and a water-laden adsorbent solid, the water-adsorbent solid being selected from among 3A, 4A and 5A sieves, b) passing the water-depleted natural gas through a solid adsorbing heavy hydrocarbons comprising at least five carbon atoms so as to obtain a heavy hydrocarbon-depleted natural gas and a heavy hydrocarbon-laden adsorbent solid, the heavy hydrocarbon-adsorbent solid being selected from among the X and Y faujasite zeolites, and activated charcoals, c) liquefying the heavy hydrocarbon-depleted natural gas at a pressure above 40 bar abs so as to obtain a liquid natural gas under pressure, and d) expanding the liquid natural gas under pressure obtained in stage c) to atmospheric pressure so as to obtain a liquid natural gas and a gas fraction.

2. A method as claimed in claim 1, wherein the adsorbent solids are regenerated by passing a purge gas at high temperature, ranging between 150° C. and 400° C., through the heavy hydrocarbon-laden adsorbent solid, then through the water-laden adsorbent solid.

3. A method as claimed in claim 2, wherein the purge gas consists of a portion of the heavy hydrocarbon-depleted natural gas.

4. A method as claimed in claim 2, wherein the purge gas consists of a portion of said gas fraction obtained in stage d).

5. A method as claimed in claim 1, wherein stage c) consists in cooling the natural gas by heat exchange.

6. A method as claimed in claim 1 wherein, prior to stage a), the natural gas is passed through a mesoporous adsorbent material.

7. A method as claimed in claim 6, wherein the mesoporous adsorbent material is selected from among activated aluminas and silica gels.

8. A method as claimed in claim 1 wherein, prior to stage a), a dry natural gas deacidizing stage is carried out.

9. A method as claimed in claim 1 wherein, prior to stage a), the dry natural gas is cooled to a temperature ranging between 20° C. and 40° C., the water condensed upon cooling being separated from the dry natural gas.

* * * * *